United States Patent [19]

Kitajima et al.

[11] Patent Number: 5,049,735
[45] Date of Patent: Sep. 17, 1991

[54] APPARATUS FOR DETECTING LIGHT RECEIVING POSITION

[75] Inventors: Eiichi Kitajima, Yokohama; Akihiko Morishita, Kawasaki, both of Japan

[73] Assignee: Nikon Corporation, Tokyo, Japan

[21] Appl. No.: 549,417

[22] Filed: Jul. 6, 1990

[30] Foreign Application Priority Data

Jul. 10, 1989 [JP] Japan .................................. 1-177789

[51] Int. Cl.⁵ ............................................. H01J 40/14
[52] U.S. Cl. ................................ 250/206.1; 250/208.2
[58] Field of Search ............... 250/203.1, 206.1, 208.2, 250/560, 561; 356/399, 400

[56] References Cited

U.S. PATENT DOCUMENTS 4,926,042  5/1990  Naito et al. ........................ 250/561
4,948,967  8/1990  Naito et al. ........................ 250/561

Primary Examiner—David C. Nelms
Assistant Examiner—Khaled Shami
Attorney, Agent, or Firm—Shapiro and Shapiro

[57] ABSTRACT

The present invention provides an apparatus for detecting a light receiving position, comprising: a light receiving portion including M×N light receiving elements arranged along a straight line at a predetermined pitch; a plurality of M digital circuits each for outputting a detection signal when an added level of an input signal exceeds a predetermined level, the M×N light receiving elements being connected to the M digital circuits for N by N, respectively; a plurality of N analogue circuits each for outputting the added level of the input signal, the light receiving elements connected to the M digital circuits for N by N respectively being connected to the N analogue circuits by N, respectively; and a calculating means connected to the M digital circuits and the N analogue circuits, for calculating a light receiving position of beam light incident to the light receiving portion, on the basis of outputs from the digital circuits and the analogue circuits.

2 Claims, 3 Drawing Sheets

APPARATUS FOR DETECTING LIGHT RECEIVING POSITION

BACKGROUND OF THE INVENTION

1. Field of the Invention

The present invention relates to an apparatus for detecting a light receiving position used with a leveling instrument and the like.

2. Related Background Art

In the past, as an example of apparatus for detecting a light receiving position used with leveling instruments, an arrangement as shown in FIG. 1 has been proposed. In FIG. 1, one ends of sixteen optical fibers 51-66 are arranged along a straight line to form a light receiving plane, and the other ends of the sixteen optical fibers 51-66 are connected to sixteen light dividing or branching devices 51A-66A, respectively, so that two optical fiber paths extending from each light branching device 51A-66A are provided in such a way that respective ones 51b-54b of two optical fibers branched by the light branching devices 51A, 52A, 53A and 54A are connected to a light receiving element A, respective ones 55b-58b of two optical fibers branched by the light branching devices 55A, 56A, 57A and 58A are connected to a light receiving element B, respective ones 59b-62b of two optical fibers branched by the light branching devices 59A-62A are connected to a light receiving elements C, respective ones 63b-66b of two optical fibers branched by the light branching devices 63A-66A are connected to a light receiving element D, and further the other optical fibers 51a, 55a, 59a, 63a branched by the light branching devices 51A, 55A, 59A, 63A respectively are connected to a light receiving element E, the other optical fibers 52a, 56a, 60a, 64a branched by the light branching devices 52A, 56A, 60A 64A respectively are connected to a light receiving element F, the other optical fibers 53a, 57a, 61a, 65a branched by the light branching devices 53A, 57A, 61A, 65A respectively are connected to a light receiving element G, and the other optical fibers 54a, 58a, 62a, 66a branched by the light branching devices 54A, 58A, 62A, 66A respectively are connected to a light receiving element H. The light receiving elements A-H are connected to a detective circuit 70 which is in turn connected to a CPU 71 to which a display 72 is also connected. The deviation of a measured position (position to be measured) can be measured by arranging the light receiving position detecting apparatus at the measured position, by illuminating beam light from a reference position onto the detecting apparatus, and by measuring a position of the beam light on the detecting apparatus. By the way, when the beam light moving in the light receiving plane at the one ends of the optical fibers 51-66 along the latter is situated in a position corresponding to any one of the optical fibers 51-66, it is possible to detect which optical fiber (among the optical fibers 51-66) relates to the beam light and to indicate the result on the display 72, by detecting the position of the beam light by means of two light receiving elements on the basis of the digital information from the two sets of the light receiving elements A-D and E-H.

That is to say, for example, it is assumed that the beam light is situated at a position corresponding to one end of the optical fiber 53; in this case, although the light receiving element A emits a signal representing the fact that it receives the beam light, since the light receiving element A is connected to four optical fibers 51-54, it is impossible to determine which optical fiber relates to the beam light. Thus, such determination is completed by the aid of an output signal from the other set of light receiving elements E-H. More specifically, it is possible to know the fact that the beam light relates to one end of the optical fiber 53, on the basis of the output signals from the light receiving elements A and G.

In the above-mentioned conventional light receiving position detecting apparatus, there arose a porblem that a position smaller than the pitch between the adjacent two optical fibers could not be detected. Further, there also arose a problems that the arrangement and connection of the optical fibers became complex and the assembly operability was troublesome, since the beam light is received by a plurality of optical fibers.

SUMMARY OF THE INVENTION

An object of the present invention is to provide an apparatus for detecting a light receiving position, which does not use any optical fiber and has high resolving power.

The above object is achieved by the present invention which provide an apparatus for detecting a light receiving position, comprising a light receiving portion composed of M groups linearly arranged each including N light receiving elements linearly arranged in order, where M and N each is an integer, M digital circuits corresponding to the respective M groups of the light receiving portion, each digital circuit being connected to each of light receiving element of the corresponding group of said light receiving portion and adding input signals therefrom to output a detection signal information when the added value exceeds a predetermined level, N analogue circuits each connected to the light receiving element of the same order in each of all groups of said light receiving portion and adding input signals therefrom to output an added value information, and calculating means connected to said M digital circuits and said N analogue circuits, for calculating a light receiving position of beam light incident to said light receiving portion, on the basis of the informations from said M digital circuits and said N analogue circuits.

According to the present invention, since a rough reading of positions corresponding to the positions of the light receiving elements can be effected by the digital circuits and a fine or accurate reading of positions between the adjacent light receiving elements can be effected by the analogue circuits, it is possible to detect any light receiving position smaller than the pitch (predetermined distance) between the adjacent light receiving elements with the high resolving power. Further, since the light receiving portion can be easily assembled by merely arranging the light receiving elements, the operability is improved.

DESCRIPTION OF THE PREFERRED EMBODIMENTS

Figure 1:
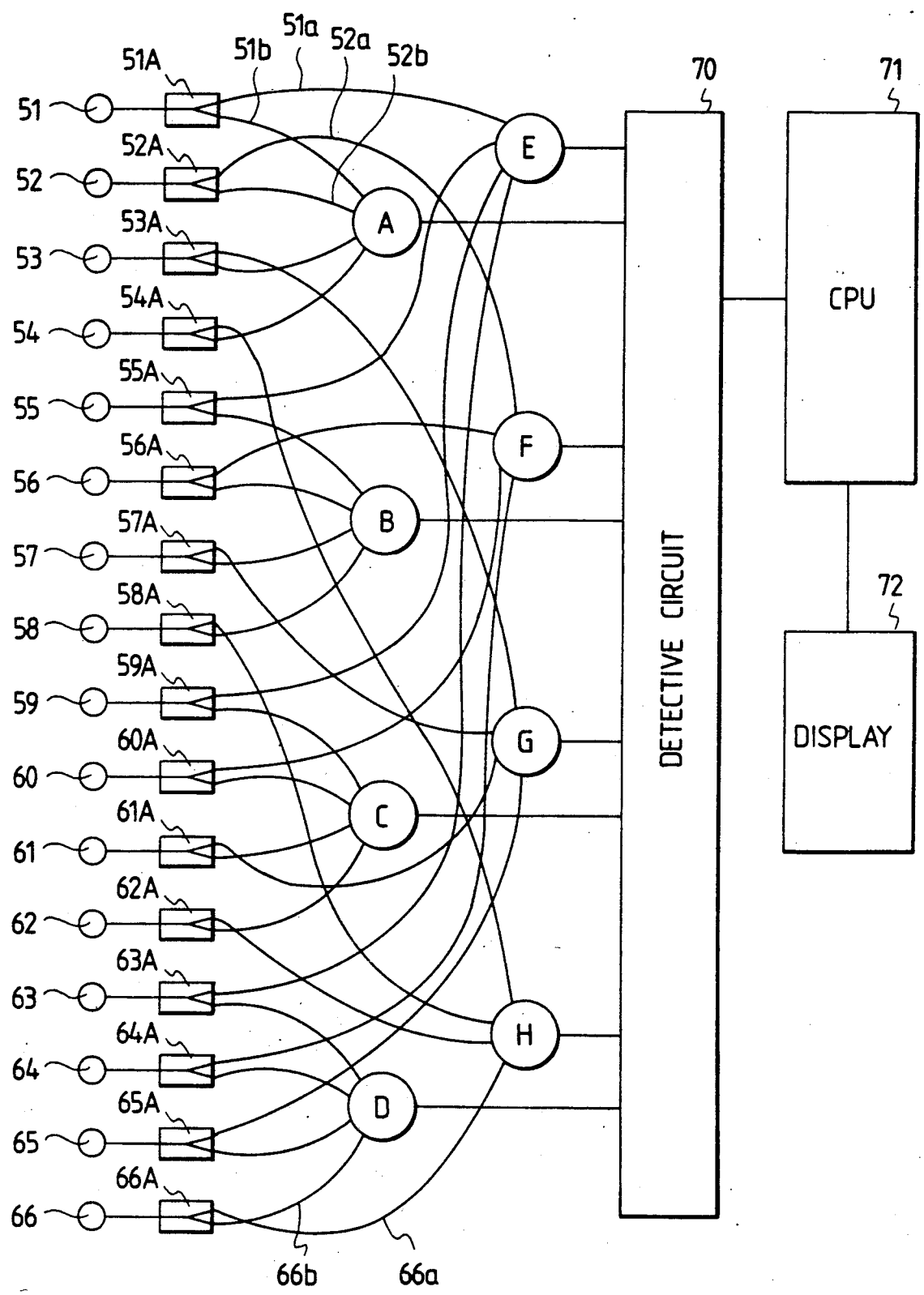
FIG. 1 is a block diagram showing a principle of a conventional light receiving position detecting apparatus.
Figure 2:
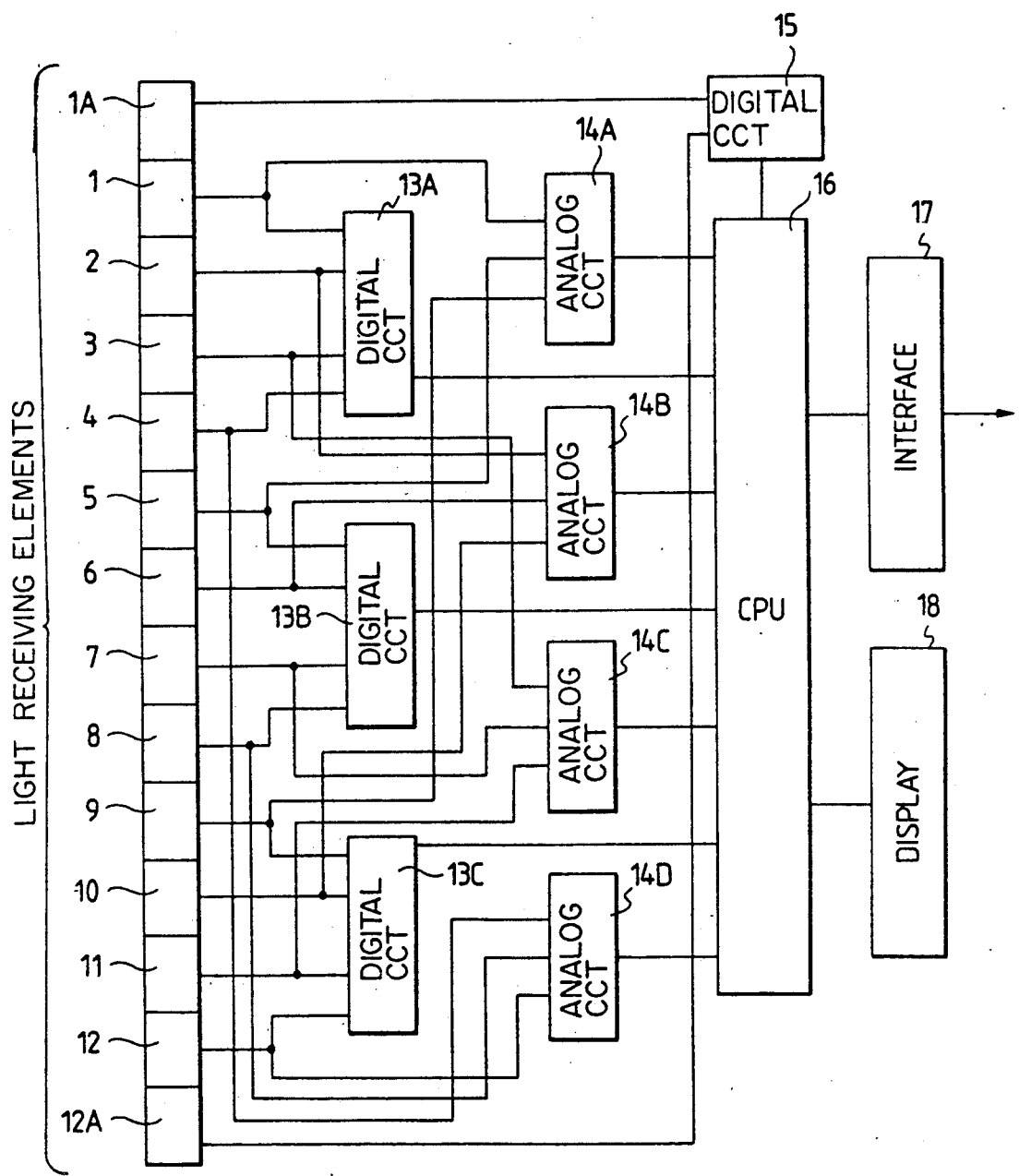
FIG. 2 is a block diagram of a light receiving position detecting apparatus according to a preferred embodiment of the present invention.

FIG. 2 shows a constructional principle of an apparatus for detecting a light receiving position, according to a preferred embodiment of the present invention, where flat light receiving elements 1 to 12 having the same rectangular light receiving surfaces are arranged continuously along a straight line to form a light receiving portion. Outputs of the light receiving elements 1-4 are connected to a digital circuit 13A, outputs of the light receiving elements 5-8 are connected to a digital circuit 13B, and outputs of the light receiving elements 9-12 are connected to a digital circuits 13C. Further, the light receiving elements 1, 5, 9 are also connected to an analogue circuit 14A. Similarly, the light receiving elements 2, 6, 10 are connected to an analogue circuit 14B, the light receiving element 3, 7, 11 are connected to an analogue circuit 14C, and the light receiving elements 4, 8, 12 are connected to an analogue circuit 14D. Light receiving elements 1A and 12A disposed on both ends of the light recieving portion are connected to a digital circuit 15.

Each of the digital circuits 13A, 13B, 13C and 15 has an adder for adding input signals, a comparator and the like, and is so designed that an output thereof is inversed when sum or added value of each input signal exceeds a predetermined level. Outputs of the digital circuits 13A, 13B, 13C and 15 are inputted to an CPU (central processing unit) 16. Further, each of the analogue circuits 14A to 14D has an adder, a peak hold circuit and the like, and is so designed as to hold the sum or added value of each input signal at a measuring point. Output of the analogue circuits 14A-14D are also inputted to the CPU 16. The data processed in the CPU 16 are fed to an external device as the communication data through an interface 17. Further, the data processed in the CPU 16 are inputted to a display 18.

Figure 3:
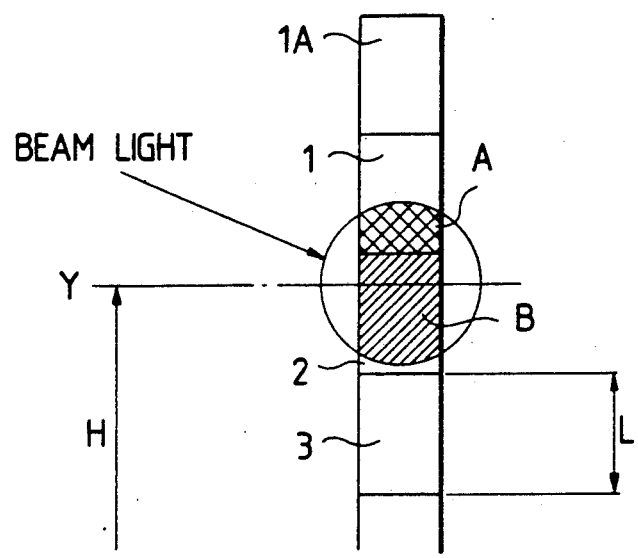
FIGS. 3 and 4 are explanatory views showing the relationship between beam light and light receiving elements.

Next, an operation of the apparatus shown in FIG. 2, will be explained. The relationship between a diameter R of beam light incident to the light receiving portion and the light receiving elements is so set, as shown in FIG. 3, that the diameter of the circular beam light is longer than a length L of the light receiving element (equal to the pitch) and is smaller than 2L. (strictly speaking, the diameter of the beam light will be maximum when the circumferential periphery of the beam light contacts outer ends of the two adjacent light receiving elements). Assuming that the beam light having such diameter illuminates both the light receiving elements 1 and 2, the outputs of the light receiving elements 1 and 2 are inputted to the digital circuit 13A as shown in FIG. 2. The digital circuit 13A judges the fact that the addition of the output signals of the light receiving elements 1 to 4 exceeds a predetermined value and generates an output with, for example, HIGH level. The predetermined value is set to judge whether the beam light relates to any set of the light receiving elements 1-4, 5-8 or 9-12, and is set to a level so low as to be not effected by noise and as to be able to discriminate the beam light from the absence of the beam light, taking account of permitting the discrimination when the beam light resides in a boundary between two sets of the light receiving elements. Since the CPU 16 can judge roughly which set of the light receiving elements relates to the beam light, it judges the fact that the beam light relates to the set of the light receiving elements 1-4 in the case of FIG. 3. The other outputs of the light receiving elements 1 and 2 are inputted to the analogue circuits 14A and 14B, respectively. In the analogue circuits 14A and 14B, the light amounts of the beam light received by the light received by the light receiving elements 1 and 2 are converted into electric analogue values, respectively, which values are inputted to the CPU 16. Accordingly, the CPU 16 can determine which light receiving element 1, 2, 3 or 4 relates to the beam light, by detecting the maximum output among them from the analogue circuits 14A to 14D. As a result, in the case of FIG. 3, it is judeged that the beam light relates to the light receiving element 2. In order to read or determine a position smaller than the length of the light receiving element (i.e., smaller than a pitch), the CPU 16 compares the analogue value of the analogue circuit having the maximum output and the analogue value of the analogue circuit having the second largest output.

Figure 4:
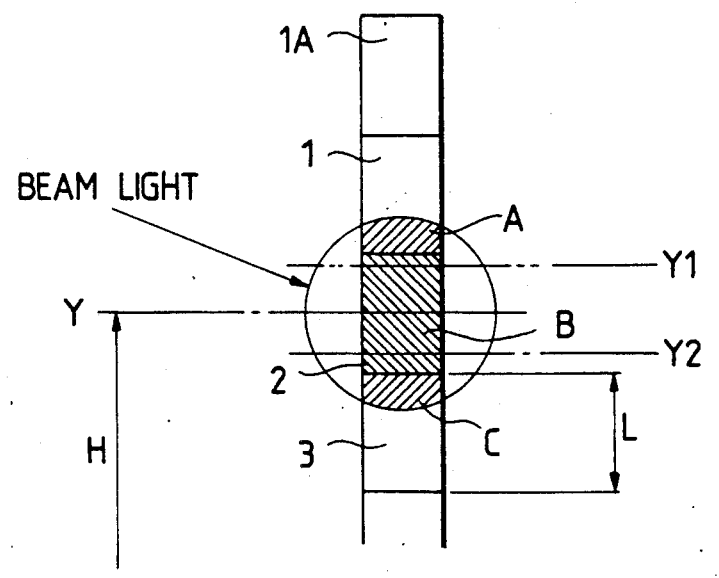

In the case of FIG. 3, the CPU 16 determines a comparison value y on the basis of the following equation:

$$y = (A - B)/(A + B)$$

where, A is the analogue value of the light receiving element 1 and B is the analogue value of the light receiving element 2. That is to say, since the comparison value y is a ratio between areas of the beam light illuminating the light receiving elements, by seeking positional information corresponding to value from a previously set retrieval table, a central position Y of the beam light can be obtained. On the other hand, as shown in FIG. 4, in the case where the beam light illuminates three light receiving elements 1, 2 and 3, by firstly seeking a false central position $Y_1$ of the beam light illuminating the light receiving elements 1, 2 and a false central position $Y_2$ of the beam light illuminating the light receiving elements 2, 3 from the previously set retrieval table, respectively, on the basis of the equations $y_1 = (A - B)/(A + B)$ and $y_2 = (C - B)/(C + B)$, respectively (where, A, B and C are the analogue values of the light receiving elements 1, 2 and 3, respectively) (in this case, B is the maximum), and by calculating a central position between $Y_1$ and $Y_2$, a true central position Y of the beam light can be obtained. By adding these values to the group or set information sought from the digital circuit 13A, an absolute position H of the beam light can be obtained. The absolute position H of the beam light is digitally indicated on the display 18. Further, the data regarding the absolute position H of the beam light can be communicated with an external processing device such as a personal computer through the interface 17. As shown in FIG. 2, the light receiving elements 1A and 12A serve to detect the fact that the beam light exceeds the outer boundaries of the measurable range between the light receiving elements 1 and 12, and an output from the light receiving element 1A or 12A is inputted to the CPU 16 through the digital circuit 15. In this case, since the position of the beam light exceeding the light receiving element 1 or 12 is indistinct, the CPU 16 causes an appropriate alarm device (not shown) to generate an audible alarm signal, to prevent the erroneous detection.

Accordingly, an operator can know the position of the beam light only by looking as the indication on the display 18. Since the indication on the display 18 is not a value obtained with a minimum resolving power corresponding to the length of each light receiving element 1-12, but is an interpolated value including one smaller than the length of each light receiving element 1-12, the position of the beam light can be obtained with high resolving power.

Incidentally, in the illustrated embodiment, while the light receiving portion was constructed by arranging continuously the flat light receiving elements having the same rectangular light receiving surfaces along the straight line, each light receiving element may have a circular light receiving surface, and the light receiving elements may be spaced at a predetermined pitch (not continuously arranged). However, also in this case, it is necessary to keep the relation $P \leq R \leq 2P$ between the pitch P (between light receiving elements) and the diameter R of the beam light.

Also in this case, assuming that the number of the light receiving elements is $M \times N$ (M and N are a natural number, respectively), the light receiving elements may be grouped by N, and a plurality of (M in number) groups or set of light receiving elements may be connected to M (in number) digital circuits, respectively, and N (in number) light receiving elements in the same group may be connected to the respective analogue circuits. The digital circuits and the analogue circuits in this case may be similar to those shown in FIG. 2.

Incidentally, in the case of FIG. 2, corresponding to the above explanation, M becomes three (M=3), and N becomes four (N=4).

Further, when the beam light illuminates both the light receiving elements 4 and 5, since the digital circuits 13A and 13B are both changed to HIGH levels, the CPU 16 can determine that fact on the basis of such HIGH level signals. In this case, the output of the analogue circuits 14D and 14A are used to calculate to position of the beam light.

As mentioned above, according to the present invention, since any optical fibers resulting in the complicated construction are not used at all, the arrangement of the light receiving portion will be simple, and, since both analogue value and digital value are used to detect the position of the beam light, the position of the beam light can be determined with high resolving power.

What is claimed is:

1. An apparatus for detecting a light receiving position, comprising:
    a light receiving portion composed of M groups linearly arranged each including N light receiving elements linearly arranged in order, where M and N each is an integer;
    M digital circuits corresponding to the respective M groups of the light receiving portion, each digital circuit being connected to each of light receiving element of the corresponding group of said light receiving portion and adding input signals therefrom to output a detection signal information when the added value exceeds a predetermined level;
    N analogue circuits each connected to the light receiving element of the same order in each of all groups of said light receiving portion and adding input signals therefrom to output an added value information; and
    calculating means connected to said M digital circuits and said N analogue circuits, for calculating a light receiving position of beam light incident to said light receiving portion, on the basis of the informations from said M digital circuits and said N analogue circuits.

2. An apparatus for detecting a light receiving position according to claim 1, wherein a pitch P between said light receiving elements and a diameter R of said beam light have a relation ship $P \leq R \leq 2P$.

* * * * *